United States Patent [19]

Michalko

[11] 4,028,216
[45] June 7, 1977

[54] METHOD FOR PRODUCING AN ALUMINA SOL
[75] Inventor: Edward Michalko, Chicago, Ill.
[73] Assignee: Universal Oil Products Company, Des Plaines, Ill.
[22] Filed: May 30, 1975
[21] Appl. No.: 582,524
[52] U.S. Cl. .......................... 252/313 R; 252/463; 423/626
[51] Int. Cl.² ...................... B01J 13/00; C01F 7/02
[58] Field of Search ............... 252/313 R; 423/626, 423/627

[56] References Cited
UNITED STATES PATENTS

| 2,787,522 | 4/1957 | Lefrancois | 252/313 R X |
| 3,020,242 | 2/1962 | McCartney et al. | 252/313 R X |
| 3,340,205 | 9/1967 | Hayes et al. | 252/313 R |
| 3,535,268 | 10/1970 | Hayes | 252/313 R |

OTHER PUBLICATIONS

Mellor's Modern Inorganic Chemistry, Revised & Edited by Parkes et al., Longmans, Green & Co., New York, (1939), p. 205.

Primary Examiner—Richard D. Lovering
Attorney, Agent, or Firm—James R. Hoatson, Jr.; Robert W. Welch; William H. Page, II

[57] ABSTRACT

A stoichiometric amount of aluminum is commingled with hydrochloric acid in an aqueous media to provide a final reaction mixture containing from about 10 to about 14 wt. % aluminum in from about a 1:1 to about 1.5:1 ratio with the chloride anion content thereof. The mixture is treated in the presence of a soluble salt of cobalt or nickel at conditions effecting substantially complete digestion of the aluminum.

1 Claim, No Drawings

METHOD FOR PRODUCING AN ALUMINA SOL

This invention relates to the manufacture of an alumina sol. While alumina sols are utilized almost exclusively for the manufacture of alumina, the alumina product finds extensive use, particularly in the petroleum and chemical industries as dehydrating, treating and purifying agents, and especially as a catalyst or as a support for other catalytic materials.

In the manufacture of catalysts comprising alumina, it is frequently desirable to include a halogen component in the alumina sol — usually chlorine, which appears in the final product in a combined form lending a desired degree of acidity to the catalyst to promote the activity, selectivity and/or stability thereof with respect to certain hydrocarbon conversion reactions.

A convenient method of preparing a chlorine-containing alumina sol comprises digesting aluminum in an aqueous hydrochloric acid solution. The digestion of aluminum in aqueous hydrochloric acid is a common and commercially acceptable method of manufacturing alumina sols. Typically, aluminum particles, hydrochloric acid and water are charged to a digestion vessel, the aluminum being charged well in excess of the stoichiometric amount required to produce a sol of predetermined aluminum content. The excess aluminum has heretofore been required to effect the digestion reaction at a commercially acceptable rate. In any case, the digestion reaction is monitored, usually by monitoring the evolution of hydrogen, as the acidic solution is circulated over the aluminum particles. When it appears that the circulating solution contains at least a slight excess of dissolved aluminum, the resulting acidic alumina sol is separated from the digestion vessel, and the aluminum to chloride ratio adjusted by the addition of a proper amount of aqueous hydrochloric acid thereto.

A problem arises with respect to the acidic alumina sol retained on the undissolved aluminum retained in the digestion vessel. The acidic sol continues to digest the aluminum with the formation of higher molecular weight sol polymers, and the rate of formation increases with the molecular weight of the polymers. With each succeeding operation wherein make-up quantities of aluminum, hydrochloric acid and water are charged to the digestion vessel, more and more of the sol polymer is formed and recovered in the acidic alumina sol product, and said product tends to become milky and stratify into several distinct layers indicative of a non-homogeneous sol and consequently an ultimate alumina product of non-uniform composition. It will be appreciated that this condition is not conductive to product reproducibility — an extremely important factor in the art of catalyst manufacture.

It is therefore an object of this invention to present a novel method for producing an alumina sol by digesting aluminum in an aqueous hydrochloric acid solution, which method obviates the need of an excess of the aluminum reactant. If is a further object to present a novel method for accelerating the digestion of aluminum in aqueous hydrochloric acid to produce an alumina sol.

In one of its broad aspects, the present invention embodies a method for producing an alumina sol which comprises commingling a stoichiometric amount of aluminum with hydrochloric acid in an aqueous media to provide a final reaction mixture containing from about 10 to about 14 wt. % aluminum and from about a 1:1 to about a 1.5:1 ratio with the chloride anion content thereof, and treating the reaction mixture in the presence of a soluble salt of cobalt or nickel at conditions effecting substantially complete digestion of said aluminum.

Other objects and embodiments of this invention will become apparent in the following detailed specification.

While the method of this invention is described with reference to the digestion of aluminum and the manufacture of alumina sols, it is understood that the method may be similarly employed in the manufacture of other sols normally derived from the digestion of a suitable metal in an acid media. For example, the method may be employed to effect the digestion of chromium, iron, zirconium, gallium, etc., to form the corresponding sols either per se or in combination with aluminum.

While the method of this invention is useful for the manufacture of sols corresponding to the enumerated metals, the method is particularly applicable to the manufacture of alumina sols and the further description of the method of this invention will be presented with respect thereto. The aluminum reactant may be of any available commercial grade. However, apart from the improvement of this invention, the aluminum digestion rate is affected by the purity of the aluminum as well as the shape and particle size thereof. Very pure aluminum, say about 99.99% pure, reacts rather slowly although the reaction rate is somewhat improved utilizing aluminum turnings or a finely subdivided form of aluminum whereby a maximum surface area is exposed to the acid media. Aluminum globules of about ¼ inch to ½ inch diameter, such as are formed by dropping molten aluminum into water, are a particularly useful form of aluminum. The aluminum digestion rate is substantially increased utilizing a relatively impure aluminum, say from about 99.0 to about 99.0% pure, and it is preferred to utilize said aluminum, especially in view of the fact that a substantially pure aluminum sol may be produced therefrom by the expedient of passing the sol product through a magnetic field, iron being the principal impurity normally encountered.

Alumina sol of predetermined composition with respect to aluminum and chloride content as well as aluminum/chloride ratio are prepared by the method of this invention. Usually, it is preferred to maintain the chloride level of the sol product at from about 8 to about 13 wt. % thereof. Sols that contain aluminum in excess of about 16 wt. % are highly unstable so that it is preferable to maintain the aluminum content at less than about 15 wt. %, and more preferably at from about 10 to about 14 wt. %. The aluminum/chloride ratio of the sol product, which influences the physical properties of the alumina derived from the ultimate sol product, is usually maintained at from about 1:1 to about 1.5:1

As heretofore practiced, the preparation of an alumina sol by the acid digestion of aluminum involves the addition of metered quantities of aluminum, acid and water to a reactor or digestion vessel while maintaining an excess of the aluminum reactant therein at all times. In accordance with the present invention, only a stoichiometric amount of aluminum required to produce a predetermined quantity of an alumina sol containing from about 10 to about 14 wt. % aluminum and from about a 1:1 to about a 1.5:1 ratio with the chloride anion content thereof, is charged to the digestion vessel. The entire required amount of aluminum may be charged to the digestion vessel and the hydrochloric acid subsequently metered thereto as the digestion reaction proceeds, or any portion of the entire required amount of aluminum may be initially charged to the digestion vessel with the balance being charged thereto during the course of the digestion operation. The digestion reaction will typically proceed at an acceptable rate during the initial stages, particularly while any substantial amount of undissolved aluminum is present, and it may be desirable to add the cobalt or nickel salt only during the later stages of the digestion reaction when the digestion rate begins to slow.

Pursuant to the present invention, the aluminum, hydrochloric acid and water mixture is treated in the presence of a soluble salt of cobalt or nickel at conditions effecting substantially complete digestion of the aluminum. Soluble cobalt and nickel salts include such as cobalt chloride, cobalt chlorate, cobalt perchlorate, cobalt bromide, cobalt fluoride, cobalt iodide, cobalt nitrate, cobalt sulfate, cobalt acetate, nickel acetate, nickel formate, nickel sulfate, nickel nitrate, nickel chloride, nickel bromide, nickel fluoride, nickel iodide, and the like. The halide salts, particularly cobalt chloride and nickel chloride, are preferred. Only catalystic amounts, say from about 0.05 to about 0.5 wt. % based on the weight of the aluminum reactant, need be employed. However, larger quantities up to about 20 wt. % may be employed, for example to include cobalt or nickel in the alumina sol to be precipitated or cogelled therewith as a catalystic component of the final alumina product.

The digestion reaction is typically and advantageously effected at about the reflux temperature of the reaction mixture — generally a temperature in the 98°–115° C. range. The digestion reaction is an exothermic reaction, and the reactants may be initially combined at a rate to control the reaction at about reflux temperature, for example by the controlled addition of the aluminum reactant to the acidic solution. Reflux temperatures during the later stages of the digestion operation will invariably require the application of heat to the digestion vessel.

The following examples are presented in illustration of the method of this invention and are not intended as an undue limitation on the generally broad scope of the invention as set out in the appended claims.

EXAMPLE I

In the preparation of an alumina sol containing about 13 wt. % aluminum in about a 1.3:1 ratio with the chloride anion content thereof utilizing the prior art method whereby aluminum is digested in an aqueous hydrochloric acid solution while maintaining an excess of the alumina reactant therein, 4500 cubic centimeters of deionized water and 2074 grams of 37.6% hydrochloric acid were charged to a digestion vessel equipped with an overhead, water-cooled condenser and 1325 grams of ¼–½ inch aluminum pellets (99.9% aluminum) was added thereto over a two-hour period while maintaining the mixture at reflux temperature — about 110° C. The required stoichiometric amount of aluminum is about 1000 grams. After the solution had been circulated over the pellets for about 24 hours at reflux temperature, about 70% of the required amount of aluminum was digested, and after 48 hours about 98.8% of the required amount was digested leaving about a 325 gram excess in the digestion vessel. The alumina sol decanted from the aluminum contained 13.36 wt. % aluminum in a 1.33:1 ratio with the chloride anion content thereof, and the sol had a specific gravity at 25° C. of 1.3845.

EXAMPLE II

In the preparation of an alumina sol containing about 14.5 wt. % aluminum in about a 1.3:1 ratio with the chloride anion content thereof utilizing the method of this invention, 5700 cubic centimeters of deionized water and 2862 cubic centimeters of 37.6% hydrochloric acid were charged to a digestion vessel equipped with an overhead, water-cooled condenser, and 1400 grams of the aluminum pellets were added thereto over a 5-hour period while maintaining the mixture at reflux temperature. After about 300 grams of the aluminum pellets had been added, 18 grams of cobalt chloride hexahydrate was added thereto over a 6-hour period as an 80 cubic centimeter aqueous solution thereof. The amount of cobalt added represents 0.17 wt. % based on the alumina ($Al_2O_3$) content of the sol. Virtually all of the aluminum was digested within 24 hours to yield a sol containing 14.45 wt. % aluminum in a 1.36:1 ratio with the chloride anion content thereof, and with a specific gravity of 1.4253 at 25° C.

EXAMPLE III

In this example, the catalyst employed was a nickel chloride hexahydrate. Thus, 5700 cubic centimeters of deionized water and 2862 cubic centimeters of 37.6% hydrochloric acid were charged to the digestion vessel, and 1350 grams of the aluminum pellets were added thereto over about a 6-hour period while maintaining the mixture at reflux temperature. When about 300 grams of the aluminum pellets had been added, 9 grams of nickel chloride hexahydrate was added thereto over a 6-hour period as a 40 cubic centimeter aqueous solution thereof. The amount of nickel added represents 0.08 wt. % based on the alumina content of the sol. Substantially all of the aluminum was digested after 24 hours to yield a sol containing 14.19 wt. % aluminum in a 1.3:1 ratio with the chloride anion content thereof. The sol had a specific gravity at 25° C. of 1.4177.

It is apparent from the foregoing examples that the rate of digestion is increased considerably by the use of a soluble nickel or cobalt salt to catalyze the reaction. The alumina sols prepared by the method of this invention have been clear sols, and there has been no evidence of the high molecular weight sol polymers which give a cloudy appearance of the sol and tend to produce an inferior alumina product.

I claim as my invention:

1. A method of producing an alumina sol which comprises commingling a stoichiometric amount of aluminum with hydrochloric acid in an aqueous media to provide a final reaction mixture containing from about 10 to about 14 wt. % aluminum in from about a 1:1 to about a 1.5:1 ratio with the chloride anion content thereof, and treating the reaction mixture in the presence of from about 0.05 to about 0.5 wt. % cobalt chloride or nickel chloride based on the weight of said aluminum reactant at a reflux temperature of from about 98° C to about 115° C to effect substantially complete digestion of said aluminum.

* * * * *